United States Patent
Tietjen et al.

(10) Patent No.: US 10,076,084 B2
(45) Date of Patent: Sep. 18, 2018

(54) ROOF-GREENING CASSETTE

(71) Applicant: Soiltec GmbH, Achim (DE)

(72) Inventors: Kai Tietjen, Thedinghausen (DE); Sven Adamietz, Bremen (DE)

(73) Assignee: Soiltec GmbH, Achim (DE)

( * ) Notice: Subject to any disclaimer, the term of this patent is extended or adjusted under 35 U.S.C. 154(b) by 162 days.

(21) Appl. No.: 14/635,219

(22) Filed: Mar. 2, 2015

(65) Prior Publication Data

US 2015/0250102 A1    Sep. 10, 2015

(30) Foreign Application Priority Data

Mar. 6, 2014  (DE) .................. 10 2014 002 970

(51) Int. Cl.
*A01G 9/00*  (2018.01)
*A01G 1/00*  (2006.01)
*A01G 9/033* (2018.01)

(52) U.S. Cl.
CPC .............. *A01G 1/007* (2013.01); *A01G 9/033* (2018.02); *Y02A 30/254* (2018.01); *Y02B 80/32* (2013.01)

(58) Field of Classification Search
CPC .................... A01G 1/007; A01G 2001/008
See application file for complete search history.

(56) References Cited

U.S. PATENT DOCUMENTS

2011/0265377 A1* 11/2011 Tietjen ............. E04D 11/002
                                                        47/65.7

FOREIGN PATENT DOCUMENTS

| DE | 102009058217 A1 | 6/2011 |
| FR | 2857396 A1 | 1/2005 |
| WO | 2010025837 A1 | 3/2010 |

OTHER PUBLICATIONS

European Patent Office, Europaischer Recherchenbericht (search on a related application), Oct. 13, 2015.

* cited by examiner

*Primary Examiner* — Kristen C Hayes
(74) *Attorney, Agent, or Firm* — Laurence P. Colton; Smith Tempel Blaha LLC

(57) ABSTRACT

A roof-greening cassette, at least partially or predominantly having walls and/or bases made of (porous) material having pores, the porous material having the following properties: (a) a water absorption of 15 to 30 liters/m² in the case of a material thickness of 30 mm, and (b) a water permeability normal to the plane of 8 to 16 liters/(m² s), in the case of a water column of 200 mm and a material thickness of 30 mm.

28 Claims, 3 Drawing Sheets

20    21

ROOF-GREENING CASSETTE

STATEMENT OF RELATED APPLICATIONS

This application claims the benefit of and priority on German Patent Application No. DE 10 2014 002 970.0 having a filing date of 6 Mar. 2014.

BACKGROUND OF THE INVENTION

Technical Field

The invention relates to a roof-greening cassette, at least partially or predominantly having walls and/or bases made of (porous) material having preferably open pores. The invention additionally relates to the use of a cassette and to a method for preparing and producing roof-greening systems and also to a roof with a roof-greening cassette resting thereon.

Prior Art

Conventional roof-greening systems are constructed from a plurality of layers applied one after the other to a roof. Sedum plants are commonly used. These can be cultivated on mats and thus positioned on the prepared roof or on the layers already applied to the roof. As an alternative, the sedum plants are cultivated on an appropriate substrate layer once on the roof. This involves particularly high outlay and cannot be automated, since every roof is constructed differently. It is also the case that the steps of pre-cultivating sedum mats with the latter then being rolled up, transported to the roof and rolled out onto the roof involve relatively high outlay. Precise watering has to be ensured during the pre-cultivation step. Relatively long dry periods are harmful to the young plants in this phase. The plants may be damaged when the mats are being rolled up.

The roof-greening system can be laid out with the aid of cassettes. The cassettes have open-top compartments, which accommodate the greenery. On the one hand, the cassettes should be able to store water. On the other hand, water logging has to be avoided. It has to be possible for excess water to be discharged.

BRIEF SUMMARY OF THE INVENTION

It is an object of the present invention to create a roof-greening cassette with good water permeability along with simultaneously favourable water absorption.

In order to achieve the object, the roof-greening cassette according to the invention has at least partially or predominantly having walls and/or bases made of (porous) material having preferably open pores. The (porous) material having open pores has the following properties:
a) a water absorption of 15 to 30 liters/m$^2$ in the case of a material thickness of 30 mm, and
b) a water permeability normal to the plane of 8 to 16 liters/(m$^2$× second), in the case of a water column of 200 mm and a material thickness of 30 mm.

The water absorption is preferably 20 to 25 liters/m$^2$ and approximately 4 to 9 liters, preferably 5.5 to 7.5 liters, per cassette. The water permeability is determined in accordance with DIN EN ISO 11058 and is preferably 10 to 14 liters/(m$^2$× second), in particular approximately 12 liters/(m$^2$× second).

The porous material is, at once, water-retentive and water-permeable. Tests have shown that the aforementioned properties in combination with one another are particularly advantageous.

According to a further concept of the invention, the porous material has one or more of the following properties:
a) an air permeability of at least 400 liters/(m$^2$× second) at a test pressure and/or difference in pressure of 200 pascals, as measured on a test piece of 10 mm in thickness, and/or
b) 600 to 900 cells per cm$^2$.

The air permeability ensures good ventilation. The air permeability is tested by Textest and is in particular 550 to 750 liters/(m$^2$× second), preferably approximately 644 liters/(m$^2$× second). The pores are also referred to as cells and can absorb moisture. The cells visible on a cut surface are counted. There are, in particular, 700 to 800 cells per cm$^2$.

According to a further concept of the invention, the porous material has a tensile strength of at least 100 kilopascals, in particular of 120 to 140 kilopascals, preferably of approximately 128 kilopascals. The tensile strength indicated allows a high degree of filling and mechanical handling of the roof-greening cassette. The values indicated apply, in particular, in the region of a base wall and can be determined in accordance with DIN EN ISO 1798.

According to a further concept of the invention, the porous material has one or more of the following properties:
a) an elongation at break of at least 60%, in particular of 70 to 85%,
b) a compressive strength of at least 20 kilopascals, in particular of 24 to 28 kilopascals, and/or
c) the porous material containing carbon black for UV-stabilization purposes.

The values relate, in particular, to the base wall or bases. The elongation at break is calculated in accordance with DIN EN ISO 1798 and is preferably approximately 77%. The compressive strength in accordance with DIN EN ISO 3386-1 (40%) is preferably around approximately 26 kilopascals.

Bases are considered to be essentially horizontal walls in particular beneath the greenery or filling of a cassette or of a compartment. It is possible for a plurality of bases to form, together, the base wall and be adjacent to one another with interruptions or to merge one into the other with or without transitions. Walls are essentially upright side walls of the cassettes or compartments. Side walls in this context are also rear walls or end walls.

According to a further concept of the invention, at least the bases or the base wall consist or consists, wholly or predominantly, of the porous material. It is precisely in the region of the bases that the material properties indicated have a particularly pronounced effect.

Walls and bases advantageously consist, wholly or predominantly, of the porous or open-pored material. This facilitates production in one step or a small number of steps.

According to a further concept of the invention, the porous material is elastic, open-celled and inhomogeneous. Zones of different hardnesses and/or densities are preferably provided within the cassette. The material is easy to handle, break-resistant and can be produced from recycling material.

According to a further concept of the invention, the roof-greening cassette has at least one open-top compartment which is formed by walls and a base and preferably has a filling of inorganic substances, the latter in particular having a particle size of 0.5 mm to 10 mm.

The roof-greening cassette with one or more compartments can be filled in automated fashion, as can a multiplicity of cassettes. It is also readily possible for cassettes to be handled in automated fashion. The base wall can have a level of rigidity suitable for this purpose. Base wall and side walls have a stabilizing effect.

The walls and bases of the cassettes may be of solid or perforated design, and consist of hard or soft material. At least water permeability of the bases is preferred.

The density (in accordance with DIN EN ISO 845) of the porous material in the region of the walls is 150 to 190 kg/m³, preferably approximately 171 kg/m³. The density (in accordance with DIN EN ISO 845) of the porous material in the region of the base wall is 120 to 160 kg/m³, preferably approximately 139 kg/m³.

The cassette advantageously has walls and/or bases made of selected material of different densities, in particular produced from selected PUR flakes of different densities. It is also possible to use different materials for side walls, on the one hand, and base walls, on the other hand. A single material, however, is preferred. The aforementioned material is easy to process, can be cut to size and adhesively bonded and can be obtained cost-effectively. In particular, the material is elastically compliant.

According to a further concept of the invention, provision is made for the cassette to have zones of different densities, wherein in particular the bases or a base wall have or has a lower density than the rest of the walls.

The material used is of preferably low flammability, in accordance with German fire control class B1. Substances from class B2 can also be used.

According to a further concept of the invention, the walls and/or bases can accommodate root penetration. It is preferably the case that the material used can, as such, accommodate root penetration, for example the aforementioned material.

The walls or bases should, as far as possible, also be capable of drainage. Up to a certain quantity of water is stored in pores or similar interspaces, for example by capillary action. Further water supplied, for example by artificial watering or by precipitation, flows off or seeps out of walls and bases. The latter are therefore preferably not sealed in a water-impermeable manner on the outside; rather, they are in particular of open-pored design.

The walls or bases are preferably "visually closed" and each have a continuous, compact construction. There are no through-passages, openings, slots, apertures and the like, and it is therefore the case that even small quantities of the substrate cannot pass through the walls or bases, with the lack of sufficient interspaces. The compartments of the cassette are open only at the top, that is to say outside the walls and bases.

The material of the walls and bases is soft and/or permeable enough as to accommodate root penetration as mentioned above, in particular for sedum.

However, it is likewise possible to use other materials which have the aforementioned properties in combination or individually, e.g. substances which can be processed by moulding, blow molding, injection molding, compression molding or foaming operations, such as materials present in shred or fiber form, alone or in conjunction with matrix materials for achieving a stronger and more durable bond. It is thus possible for natural fibers or shreds of paper to be compressed, along with a bond-enhancing binder as matrix material, to form walls or bases. Water storage, water permeability or drainage capacity and/or root penetration are determined by selection of the fibers and matrix materials.

In particular the water-storing property makes it possible for the cassette to be produced in a cost-saving manner by being filled with substrate, including soil, fertilizer, shoots or seed, and with a first defined quantity of water. The latter is stored in the walls or in the base of the cassette. This means that a supply of water is necessary only after a relatively long period of time. This reduces the costs of cultivation at ground level and further care on the roof. The roof-greening cassette is positioned, preferably with the pre-cultivated plants, on the roof which is to be greened, following appropriate preparation of said roof. The cassette remains on the roof.

According to a further concept of the invention, the roof-greening cassette has a plurality of open-top compartments arranged one beside the other and/or one behind the other. The size of the individual compartments and the height of intermediate walls may be provided in dependence on the roof pitch and/or other parameters. Examples of cassettes which are suitable for a typical green roof are those with dimensions of 60 cm×100 cm with an interior height of approximately 3 cm, wall thicknesses of approximately 1 cm and a subdivision with 3×7 compartments, a compartment measuring approximately 19 cm×14 cm on the inside. Other dimensions and subdivisions are possible, at least in dependence on the overall mass, the plants used, the stability of the cassette and the roof pitch.

According to a further concept of the invention, at least one compartment contains inorganic substances, preferably as a water store, in particular natural pumice, expanded clay, lava, lightweight lava and/or expanded shale. The inorganic substances are part of the substrate and are, in particular, mineral substances.

The preferred embodiment is one in which the inorganic substances have a particle size of 0.5 mm to 10 mm, preferably up to approximately 3 mm. In addition, or as an alternative, the following densities are preferred:

natural pumice 0.3 to 1.1 kg/l or t/m³
expanded clay 0.35 to 1.8 kg/l
lava/lightweight lava 0.75 to 1.5 kg/l
expanded shale 0.9 to 1.8 kg/l.

According to a further concept of the invention, at least one compartment contains a three-dimensional random-laid scrim, drainage braid and/or nonwoven storage material, wherein these parts are arranged in the compartment, in addition to the substrate. The random-laid scrim or drainage braid has, for example, a basis weight of 300-800 g/m² in the case of a layer thickness of 5-25 mm and consists preferably of PP (polypropylene).

The aforementioned inorganic substances and/or the random-laid scrim, drainage braid or nonwoven storage material should increase the water-storage capacity. In addition, harmful substances can be bound in or filtered. It is also possible to trigger chemico-physical processes, for example a change in the pH by using appropriate inorganic substances. It is possible for the random-laid scrim, drainage braid or nonwoven storage material to be inorganic, mineral or organic or to have corresponding constituent parts. It is also possible to use composite materials for this purpose or for the walls and bases.

According to a further concept of the invention, the substrate contains organic material, in particular 5 per cent by weight or more. In particular not more than 50 per cent by weight of organic material is preferred. The substrate also contains inorganic substances, seed, shoots or plants and fertilizer. The organic material is preferably soil or earth.

The cassette is advantageously produced by cut-out walls which are adhesively bonded or welded to one another. It is also possible for the cassette to be produced as a drawn or pressed article.

According to a further concept of the invention, the roof-greening cassette has reinforcing ribs on its underside, in particular at least in one direction centrally beneath the upper-side compartments.

According to a further concept of the invention, the roof-greening cassette has grooves on its underside, for better drainage and/or for accommodating reinforcing profiles or a slat arrangement for absorbing shearing forces on a pitched roof.

The underside grooves run preferably centrally beneath upper-side compartments and/or beneath upper-side walls. In particular, the grooves run directly beneath upper-side walls and parallel thereto. It is also possible to have a combination of the aforementioned arrangements, that is to say criss-crossing grooves, wherein the grooves run preferably in one direction centrally beneath the upper-side compartments and in a direction transverse to the first direction, directly beneath the upper-side walls.

The underside grooves are designed preferably with a wedge-shaped cross section, that is to say with a width decreasing in the direction of the upper-side compartments or walls. Conversely, it is also possible for the upper-side walls to be designed with a wedge-shaped cross section, that is to say with a width increasing in the direction of the underside grooves. It is preferred, however, to have upper-side walls of rectangular cross section.

The invention also relates to the use of the cassette for preparing and producing roof-greening systems.

Finally, the invention also includes a method for greening a roof and a roof with roof-greening cassettes.

Further features of the invention can be gathered from the claims and from the rest of the description.

BRIEF DESCRIPTION OF THE DRAWINGS

Advantageous embodiments of the invention will be explained in more detail hereinbelow with reference to drawings, in which.

DETAILED DESCRIPTION OF PREFERRED EMBODIMENTS

Figure 1:
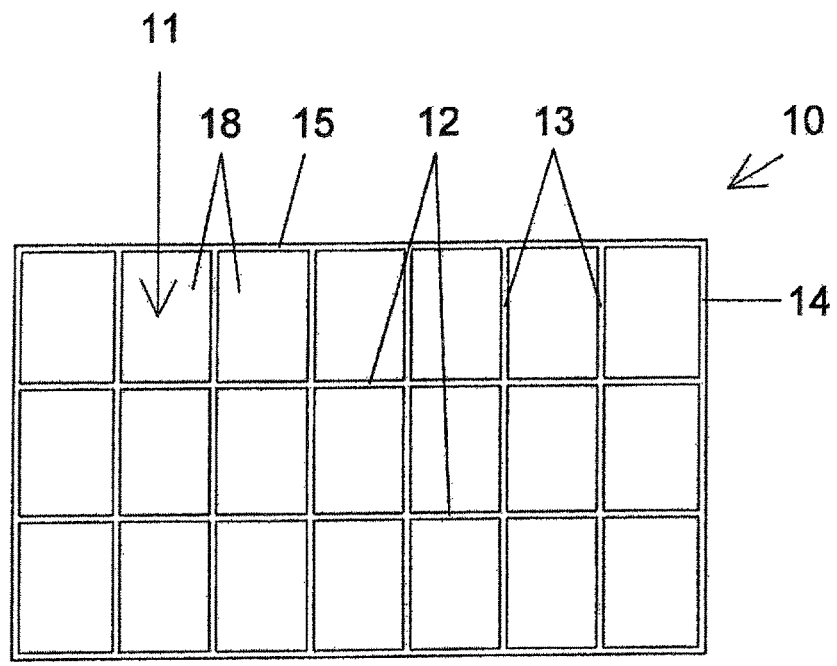
FIG. 1 shows a plan view of a roof-greening cassette.

A roof-greening cassette 10 is of cuboidal design and has, one beside the other and one behind the other, a plurality of cuboidal, open-top compartments 11, in this case seven compartments in the longitudinal direction of the cassette and three compartments in the transverse direction of the cassette, each separated by side walls, that is to say longitudinal walls 12 and transverse walls 13. Outer transverse walls are referred to as end walls 14, and outer longitudinal walls are referred to as longitudinal side walls 15.

The cassette 10 has preferably outer dimensions of approximately 100 cm (length)×60 cm (width)×5 cm (height). The cassettes are formed from strips or panels made of selected PUR flakes with a density of approximately 80 kg/m³. Depending on numbers, it is also possible for the cassettes to be produced in one piece, for example by molding or pressing. The cassette is preferably produced by virtue of the flakes being compressed in a mold, in particular in conjunction with the mold and/or the flakes being heated.

Figure 2:
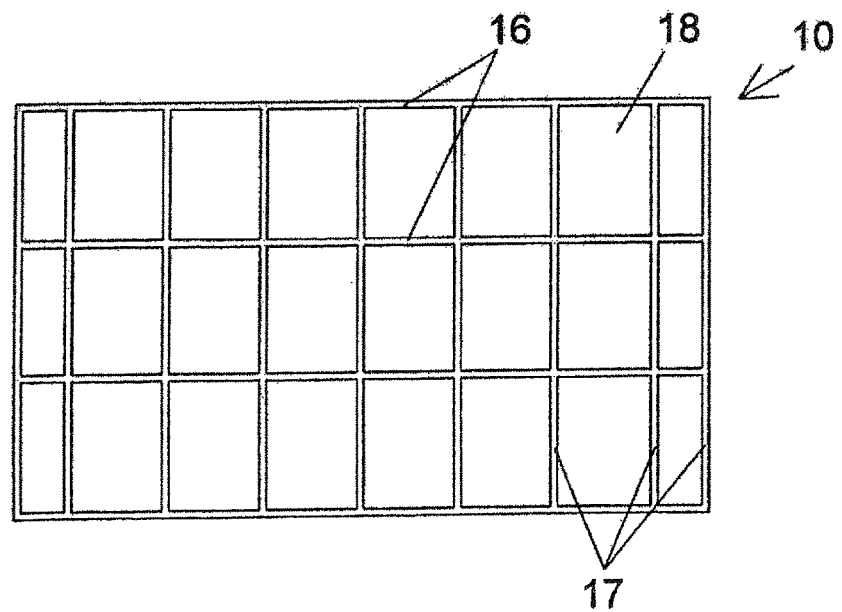
FIG. 2 shows a view of the roof-greening cassette from beneath.
Figure 3:
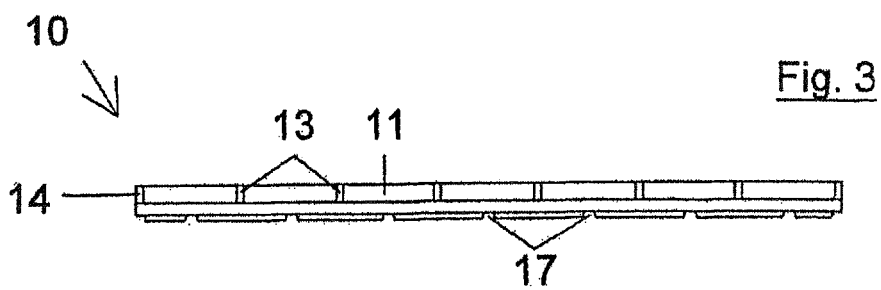
FIG. 3 shows a longitudinal section of the roof-greening cassette.
Figure 4:
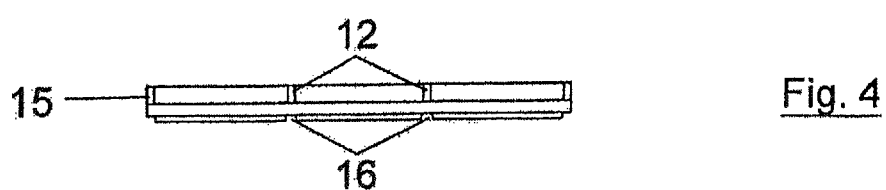
FIG. 4 shows a cross section of the roof-greening cassette.

On its underside, the cassette 10 is designed to be planar, but with a grid of transversely and longitudinally running grooves 16, 17, see base wall 18 in FIG. 2. The size of the grid formed in this way corresponds to the size of the grid made of longitudinal walls 12 and transverse walls 13. However, the transverse grooves 17 are arranged in an offset manner, that is to say approximately centrally between the transverse walls 13. According to FIG. 2, the longitudinal grooves 16 are located directly beneath the longitudinal walls 12. Here too, however, offsetting is possible, as is an arrangement of the transverse grooves 17 directly beneath the transverse walls 13.

Each compartment 11 has a dedicated base. The bases of the compartments 11, together, form the base wall 18. The bases and walls each have a thickness of approximately 1 cm.

The grooves 16, 17 can perform in particular two functions. On the one hand, the grooves allow drainage. Waterlogging is avoided. On the other hand, individual grooves can be used for accommodating reinforcing profiles. This allows shearing forces occurring on pitched roofs to be absorbed to better effect.

The compartments 11 of the cassettes are filled with substrate 19 preferably at ground level. The substrate is, in particular, soil with seeds or shoots, and possibly fertilizer, suitable for cultivating the roof greenery. A greening system with sedum is preferred. Once filled, the cassettes are positioned, and fixed, on the roof which is to be greened. Cultivation up to the point of visible plants being developed can be carried out at ground level or on the roof. It is preferable for cultivation to be carried out entirely at ground level. Better monitoring of the watering is possible in this case. The watering can take place at relatively large time intervals, for example for a first time in conjunction with the operation of filling the compartments with substrate and thereafter only after a certain time interval.

Using the material of the aforementioned type renders the walls of the cassettes—including the base wall 18—capable of accommodating root penetration and water-retentive. Depending on the material used, it is also possible to have a long service life, corresponding to the projected service life of the roof.

The preferably greened cassettes 10 are laid out one beside the other and one behind the other, without gaps, on a roof (not shown). The residual surfaces which are left on the roof as a result of the unit dimensions can have sub-cassettes laid on them. These sub-cassettes can be easily produced by virtue of individual cassettes 10 being divided and separated.

The individual walls 12 to 15 have a thickness of approximately 1 cm. On account of the necessary load-bearing capability, the base wall 18 is of somewhat thicker design, with a thickness of approximately 3 cm, minus the grooves 16, 17, of 1 cm in depth and width, which are provided in some regions. The grooves 16, 17 are also provided all the way around the periphery, that is to say beneath the end walls 14 and longitudinal side walls 15.

Figure 5:
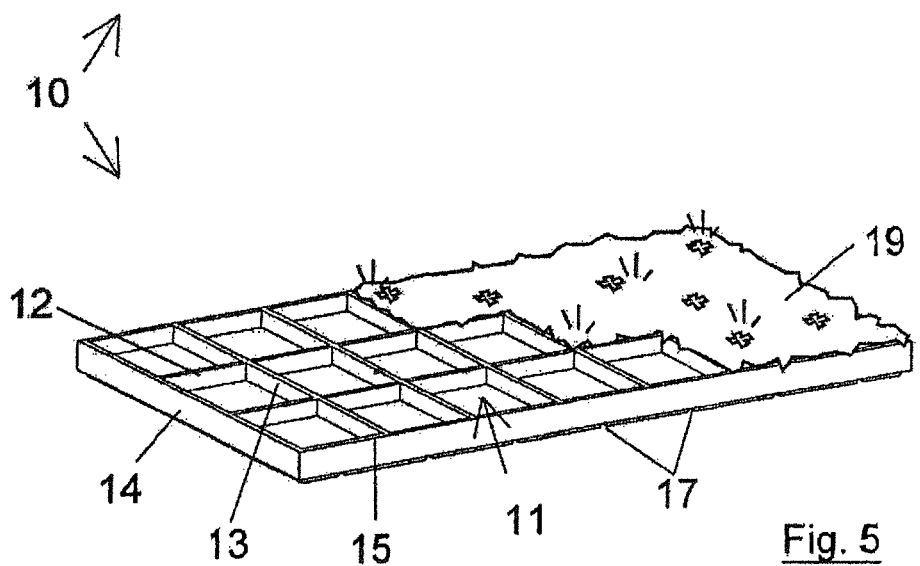
FIG. 5 shows a perspective illustration of the roof-greening cassette as seen obliquely from above.

FIG. 5 shows a cassette 10 filled partially with substrate 19. In practice, all the compartments 11 are filled with substrate.

Figure 6:
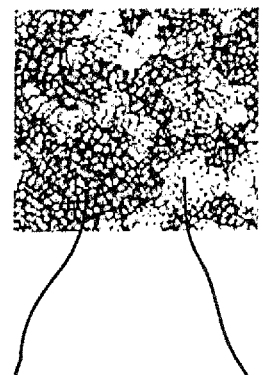
FIG. 6 shows an enlarged illustration of a cut surface.

FIG. 6 shows a cut surface of the porous material of the cassettes, measuring approximately 2 cm×2 cm. It is possible to see regions 20, 21 of different densities on account of an inhomogeneous raw material having been compressed. Said material consists, for example, of selected flakes/fibers of different densities and sizes. Some pores or cells, or transitions between the pores or cells, are visible.

LIST OF DESIGNATIONS

10 Roof-greening cassette
11 Compartments
12 Longitudinal walls
13 Transverse walls
14 End walls
15 Longitudinal side walls
16 Longitudinal grooves
17 Transverse grooves
18 Base wall
19 Substrate
20 Region
21 Region

What is claimed is:

1. A roof-greening cassette, having walls and bases, wherein at least one of the walls and the bases is made of a porous material having open pores, wherein the porous material has the following properties:
    a) a material thickness of 30 mm;
    b) a water absorption of 15 to 30 liters/m$^2$;
    c) a water permeability normal to the plane of 8 to 16 liters/(m$^2$ s) based on a water column of 200 mm: and
    d) is made of polyurethane.

2. The roof-greening cassette according to claim 1, wherein the porous material has an air permeability of 133.3 liters/(m$^2$s) at a test pressure and/or difference in pressure of 200 Pa.

3. The roof-greening cassette according to claim 1, wherein the porous material has a tensile strength of at least 100 kPa.

4. The roof-greening cassette according to claim 1, wherein the porous material has an elongation at break of at least 60%.

5. The roof-greening cassette according to claim 1, wherein at least the bases consist of the porous material.

6. The roof-greening cassette according to claim 1, wherein the walls and the bases consist of the porous material.

7. The roof-greening cassette according to claim 1, wherein the porous material is elastic, open-celled and inhomogeneous and has zones of different hardnesses.

8. The roof-greening cassette according to claim 1, further comprising at least one open-top compartment formed by the walls and the bases, the at least one open-top compartment having a filling of inorganic substances.

9. The roof-greening cassette according to claim 8, wherein the inorganic substances have a particle size of 0.5 mm to 10 mm.

10. The roof-greening cassette according to claim 1, wherein the cassette has zones of different densities.

11. The roof-greening cassette according to claim 1, further comprising underside grooves.

12. The roof-greening cassette according to claim 11, further comprising at least one open-top compartment formed by the walls and the bases, wherein the underside grooves extend at least in one direction centrally beneath the at least one open-top compartment.

13. The roof-greening cassette according to claim 11, further comprising upper side walls extending from the bases, wherein the underside grooves extend at least in one direction centrally beneath the beneath upper side walls.

14. The roof-greening cassette according to claim 11, further comprising at least one open-top compartment formed by the walls and the bases and upper side walls extending from the bases, wherein the underside grooves extend at least in one direction centrally beneath the at least one open-top compartment and beneath the upper side walls.

15. The roof-greening cassette according to claim 1, wherein the porous material has an air permeability of 183.3 to 250 liters/(m$^2$s) at a test pressure and/or difference in pressure of 200 Pa.

16. The roof-greening cassette according to claim 1, wherein the porous material has 600 to 900 cells per cm$^2$.

17. The roof-greening cassette according to claim 1, wherein the porous material has a tensile strength of 120 to 140 kPa.

18. The roof-greening cassette according to claim 1, wherein the porous material has an elongation at break of 70 to 85%.

19. The roof-greening cassette according to claim 1, wherein the porous material has a compressive strength of at least 20 kPa.

20. The roof-greening cassette according to claim 1, wherein the porous material has a compressive strength of 24-28 kPa.

21. The roof-greening cassette according to claim 1, wherein the porous material contains carbon black for UV-stabilization purposes.

22. The roof-greening cassette according to claim 1, wherein the porous material is elastic, open-celled and inhomogeneous and has zones of different densities.

23. The roof-greening cassette according to claim 1, wherein the porous material is elastic, open-celled and inhomogeneous and has zones of different hardnesses and densities.

24. The roof-greening cassette according to claim 1, wherein the walls and the bases do not have any through-passages, openings, slots or apertures.

25. The roof-greening cassette according to claim 1, wherein the bases have a lower density than the walls.

26. The roof-greening cassette according to claim 1, wherein the porous material is selected from the group consisting of:
    a) polyurethane flakes;
    b) polyurethane flakes having a common density;
    c) a mixture of polyurethane flakes having different densities; and
    d) polyurethane flakes having a density of 80 kg/m$^3$.

27. A roof comprising a roof-greening cassette resting thereon, wherein the roof-greening cassette has walls and bases, wherein at least one of the walls and the bases is made of a porous material having open pores, wherein the porous material has the following properties:
    a) a material thickness of 30 mm;
    b) a water absorption of 15 to 30 liters/m$^2$;
    c) a water permeability normal to the plane of 8 to 16 liters/(m$^2$ s) based on a water column of 200 mm: and
    d) is made of polyurethane.

28. The roof according to claim 27, wherein the porous material is selected from the group consisting of:
    a) polyurethane flakes;
    b) polyurethane flakes having a common density;
    c) a mixture of polyurethane flakes having different densities; and
    d) polyurethane flakes having a density of 80 kg/m$^3$.

* * * * *